(12) United States Patent
Lee et al.

(10) Patent No.: US 8,368,866 B2
(45) Date of Patent: Feb. 5, 2013

(54) LIQUID CRYSTAL DISPLAY DEVICE HAVING HEAT GENERATING ELECTRODE

(75) Inventors: Sun-Hwa Lee, Gyeonggi-Do (KR); Kyo-Seop Choo, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 889 days.

(21) Appl. No.: 11/166,917

(22) Filed: Jun. 27, 2005

(65) Prior Publication Data
US 2006/0139501 A1    Jun. 29, 2006

(30) Foreign Application Priority Data

Dec. 29, 2004    (KR) .................. 10-2004-0115619

(51) Int. Cl.
| | |
|---|---|
| G02F 1/133 | (2006.01) |
| G02F 1/1333 | (2006.01) |
| G02F 1/1335 | (2006.01) |
| G02F 1/1345 | (2006.01) |
| H01L 29/04 | (2006.01) |
| H01L 29/10 | (2006.01) |
| H01L 31/00 | (2006.01) |
| H01L 27/14 | (2006.01) |
| H01L 29/15 | (2006.01) |
| H01L 31/036 | (2006.01) |

(52) U.S. Cl. ............. 349/161; 349/21; 349/40; 349/58; 349/96; 349/110; 349/150; 349/162; 257/59; 257/72

(58) Field of Classification Search .................. 349/21, 349/161, 40, 58, 96, 110, 111, 150, 162; 257/59, 72
See application file for complete search history.

(56) References Cited

U.S. PATENT DOCUMENTS

| | | | | |
|---|---|---|---|---|
| 4,584,461 | A * | 4/1986 | Teshima et al. | 219/209 |
| 5,150,231 | A * | 9/1992 | Iwamoto et al. | 349/60 |
| 5,694,147 | A * | 12/1997 | Gaalema et al. | 345/101 |
| 6,133,979 | A * | 10/2000 | Komatsu et al. | 349/161 |
| 7,265,809 | B2 * | 9/2007 | Dunn et al. | 349/161 |
| 2005/0073640 | A1 * | 4/2005 | Dunn et al. | 349/161 |

FOREIGN PATENT DOCUMENTS

JP    61020017 A  *  1/1986

* cited by examiner

*Primary Examiner* — Mark Robinson
*Assistant Examiner* — Paisley L Arendt
(74) *Attorney, Agent, or Firm* — McKenna, Long and Aldridge, LLP.

(57) ABSTRACT

A liquid crystal display device includes first and second substrates, liquid crystal molecules positioned between the first and second substrates, a heat generating electrode for generating heat in response to a direct current being supplied to the heating electrode, and a backlight unit for irradiating light onto the first and second substrates.

15 Claims, 5 Drawing Sheets

LIQUID CRYSTAL DISPLAY DEVICE HAVING HEAT GENERATING ELECTRODE

The present invention claims the benefit of Korean Patent Application No. 115619/2004 filed in Korea on Dec. 29, 2004, which is hereby incorporated by reference in its entirety.

BACKGROUND OF THE INVENTION

1. Field of the Invention

The present invention relates to a display device, and particularly, to a liquid crystal display device.

2. Description of the Related Art

Recently, liquid crystal display (hereinafter, called "LCD") devices have better image quality due to the improvement of liquid crystal materials and the development of fine pixel processing techniques. Further, LCD devices are light, thin and have low power consumption. The range of applications for LCD devices is increasing. An LCD device includes a liquid crystal display (LCD) panel, a driving circuit unit for driving the LCD panel and a backlight unit for supplying light to the LCD panel. The LCD panel has liquid crystal cells arranged in a matrix format. More particularly, the LCD panel has liquid crystal cells between two glass substrates (i.e., upper and lower substrates). Each of the liquid crystal cells includes a switching device (i.e., TFT array) for switching signals supplied to the liquid crystal cells. A driving circuit unit is connected to a printed circuit board for driving the LCD panel. The LCD panel is mounted on a member together with the backlight unit, to thereby form an LCD device.

FIGS. 1 and 2 are plan views illustrating an LCD panel mounted on a member. More particularly, FIG. 1 is a plan view of the related art liquid crystal display device, and FIG. 2 is a cross-sectional view of the related art liquid crystal display device taken along line I-I'. As shown in FIG. 1, an LCD device 1 includes an LCD panel 10 and a backlight unit 15 disposed under the LCD panel 10 for supplying light to the LCD panel 10. Meanwhile, a driving circuit unit (not shown) for driving the LCD panel 10 is connected to one side of the LCD panel 10.

The LCD panel 10 and the backlight unit 15 are mounted on a mold frame 20. The LCD panel 10 and the backlight unit 15 are fixed to the mold frame 20 by a top case 19 compressing an edge of an upper surface of the LCD panel 10 and coupled with the side of the mold frame 20. A bottom cover 17 for supporting and protecting the mold frame 20 is provided under the mold frame 20.

The backlight unit 15 includes lamps for generating light. An optical sheet is positioned over the lamps for efficiently supplying the light generated from the lamps to the LCD panel 10. The optical sheet includes a light guide plate, a diffusion plate and prism sheets.

The LCD panel 10 is constructed by attaching a color filter substrate 10a to a thin film transistor substrate 10b with a cell gap therebetween. Liquid crystal molecules are positioned in the cell gap. Polarization plates 13a and 13b are attached to both surfaces of the LCD panel 10.

A color filter and a black matrix are formed on the color filter substrate 10a. A transparent electrode 11 is formed at the rear surface of the color filter substrate 10a. The transparent electrode 11 discharges static electricity that accumulates on the LCD panel 10 to the outside. The transparent electrode 11 is connected to the top case 19 and the bottom cover 17 by a conductive tape 18. Accordingly, the static electricity generated at the LCD panel 10 is supplied by the conductive tape 18 to the top case 19 and the bottom cover 17, which are grounded.

A common electrode and a pixel electrode for generating an in-plane field and driving liquid crystal molecules are formed on the thin film transistor substrate 10b. In the alternative, the common electrode may be formed on the color filter substrate 10a. In this case, the liquid crystal molecules are controlled by a vertical electric field generated between the pixel electrode and the common electrode. The LCD device displays an image by driving the liquid crystal molecules according to signals applied to the pixel electrodes.

In general, liquid crystal molecules can be driven within a temperature range of −20° C. to 60° C. Thus, when an LCD panel is used with a temperature outside of the temperature range of −20° C. to 60° C., an image cannot be normally displayed. For example, if an LCD panel is used in as a display for an airplane, it may not be possible to normally display an image in an environment below −20° C.

When the LCD panel is driven in a low-temperature environment (below −20° C.), the movement of the liquid crystal molecules is slow and thus the screen can not be normally driven. However, after a certain period of time, normal driving is possible. This is because heat generated from the backlight is transmitted to the LCD panel, thereby increasing the temperature of the liquid crystal molecules. Accordingly, since a temperature range in which liquid crystal molecules can be driven is limited in the related art, an image can not normally be displayed in a very low temperature state, which is outside the normal temperature range for driving an LCD panel.

SUMMARY OF THE INVENTION

Accordingly, the present invention is directed to a liquid crystal display device that substantially obviates one or more of the problems due to limitations and disadvantages of the related art.

An object of the present invention is to provide a liquid crystal display device that can display an image at a low temperatures.

Another object of the present invention is to provide a liquid crystal display device having improved reliability at low temperatures.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a liquid crystal display device including first and second substrates, liquid crystal molecules positioned between the first and second substrates, a heat generating electrode for generating heat in response to a direct current being supplied to the heating electrode, and a backlight unit for irradiating light onto the first and second substrates.

In another aspect, a liquid crystal display device includes a liquid crystal display panel having first and second substrates facing each other and liquid crystal molecules positioned between the first and second substrates, a backlight disposed under the display panel for supplying light to the liquid crystal display panel, a mold frame for mounting and affixing the liquid crystal display panel and the backlight, and a heat generating electrode for generating heat.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to a liquid crystal display (LCD) device of the present invention, examples of which are illustrated in the accompanying drawings, hereinafter.

Figure 1:
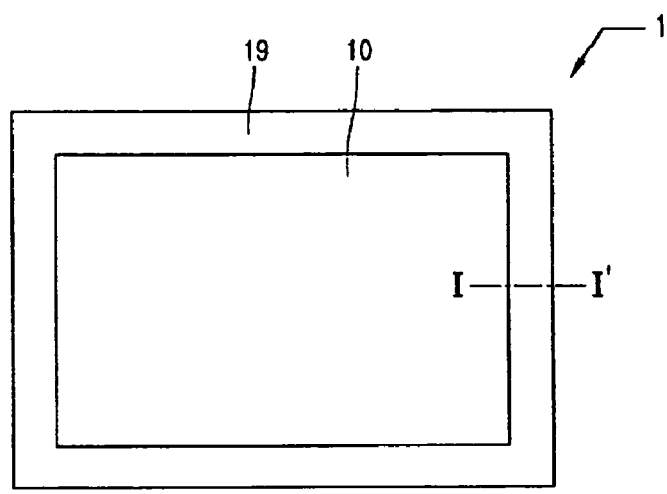
FIG. 1 is a plan view of the related art liquid crystal display device.
Figure 2:
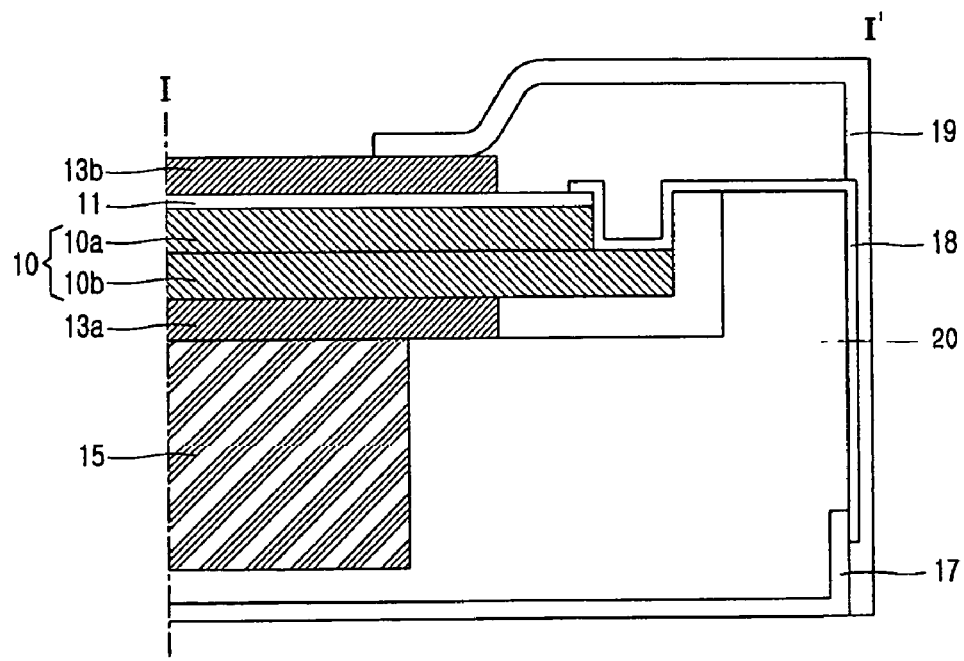
FIG. 2 is a cross-sectional view of the related art liquid crystal display device taken along line I-I'.
Figure 3:
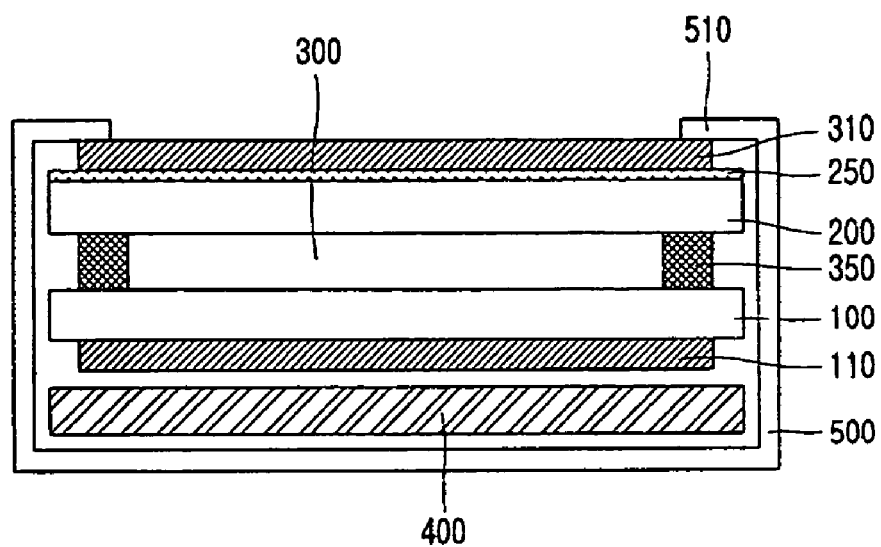
FIG. 3 is a cross-sectional view of a liquid crystal display device in accordance with an embodiment of the present invention.
Figure 4:
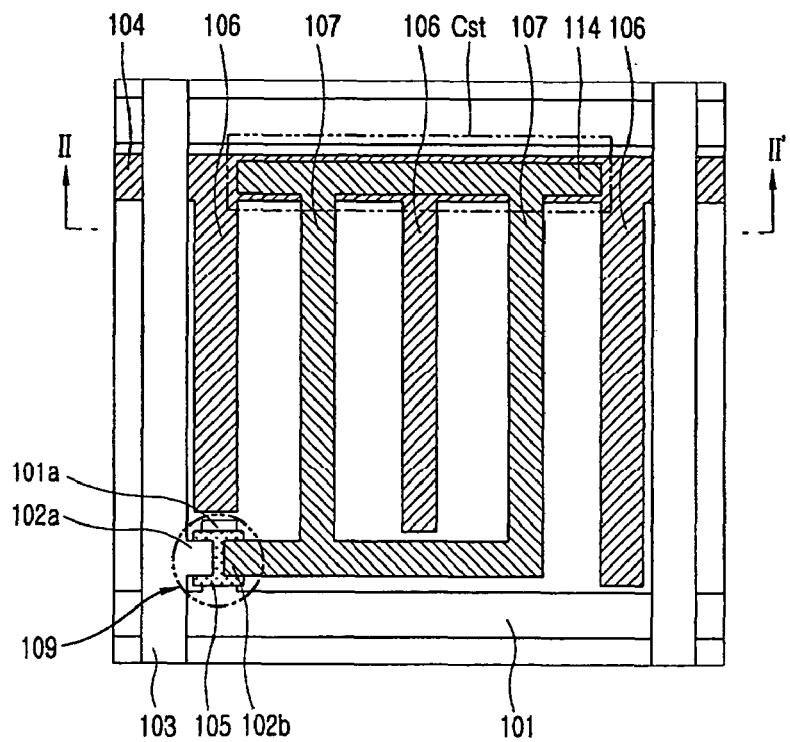
FIG. 4 is a plan view of a unit pixel on the thin film transistor substrate of the liquid crystal display device in accordance with an embodiment of the present invention.
Figure 5:
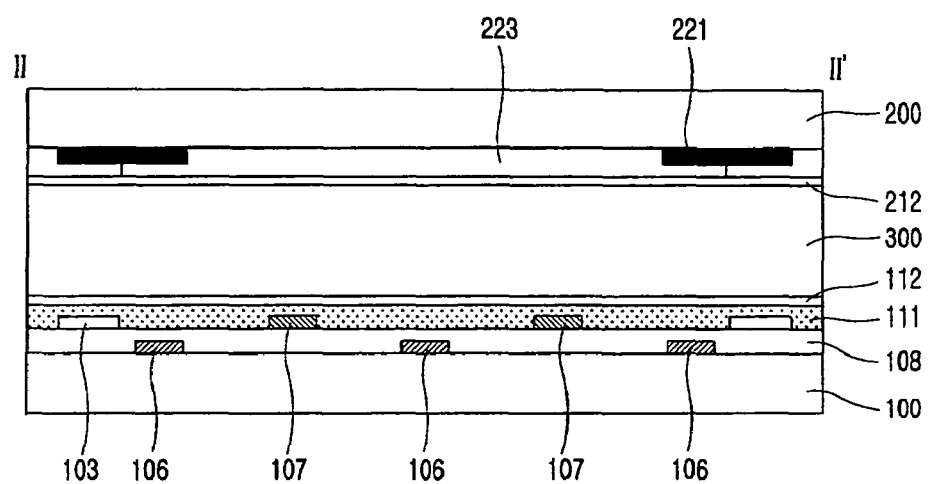
FIG. 5 is cross-sectional view taken along line II-II' of FIG. 4, including the color filter substrate.

FIG. 3 is a cross-sectional view of a liquid crystal display device in accordance with an embodiment of the present invention. FIG. 4 is a plan view of a unit pixel on the thin film transistor substrate of a liquid crystal display device in accordance with an embodiment of the present invention. FIG. 5 is cross-sectional view taken along line II-II' of FIG. 4, including the color filter substrate. FIG. 5 is a view schematically illustrating the rear of a second substrate including a heat generating electrode.

FIG. 3 is a cross-sectional view of a liquid crystal display device in accordance with an embodiment of the present invention. As shown in FIG. 3, an LCD device in accordance with an embodiment of the present invention includes an LCD panel having first and second substrates 100 and 200, which are attached by a seal 350 to form a cell gap therebetween. A layer of liquid crystal molecules 300 is positioned in the cell gap between the first and second substrates 100 and 200. A backlight unit 400 is installed under the second substrate 200 for supplying light to the first and second substrates 100 and 200.

First and second polarization plates 110 and 310 are respectively attached to the rear and front surfaces of the first substrate 100 and the second substrate 200. A heat generating electrode 250 is interposed between the second substrate 200 and the second polarization plate 310. The heat generating electrode 250 generates heat in response to a direct current supplied to the heat generating electrode. The temperature of the liquid crystal molecules 300 between the first and second substrates 100 and 200 is increased by the heat from the heat generating electrode.

Although not illustrated in FIG. 3, the backlight unit 400 includes lamps for generating light. Further, the backlight unit 400 can include and an optical sheet for efficiently distributing the light generated from the lamps across the entire surface of the LCD panel. The optical sheet can include a light guide plate, a diffusion plate and prism sheets.

As shown in FIG. 3, the LCD panel (P) and the backlight unit 400 are mounted on a mold frame 500. The LCD panel (P) and the backlight unit 400 are affixed to the mold frame 500 by a top case 510 compressing an edge of an upper surface of the second substrate 200 and coupled with the side of the mold frame 500. A bottom cover (not illustrated) for supporting and protecting the mold frame 500 is provided under the mold frame 500.

FIG. 4 is a plan view of a unit pixel on the thin film transistor substrate of the liquid crystal display device in accordance with an embodiment of the present invention. FIG. 5 is cross-sectional view taken along line II-II' of FIG. 4, including the color filter substrate. As shown in FIGS. 4 and 5, gate lines 101 arranged in a first direction and data lines 103 arranged in a second direction on the transparent substrate 100 cross each other to define pixel regions. A switching device 109 is formed adjacent to the crossing of a gate line 101 and a data line 103. The switching device 109 can be a thin film transistor that includes a gate electrode 101a, a semiconductor layer 105 formed on the gate electrode 101a, and source/drain electrodes 102a and 102b disposed on the semiconductor layer 105 at a predetermined interval.

At least a common electrode 106 and a pixel electrode 107, which generate an in-plane electric field, are formed in each of the pixels. In addition, a common line 104 for electrically connecting the common electrode 106 is arranged parallel to the gate line 101, and a pixel electrode line 114 for electrically connecting the pixel electrode 107 is disposed on the common line 104. The common line 104 and the pixel electrode line 114 have a gate insulation layer 108 interposed therebetween to form a storage capacitor (Cst). A passivation film 111 is formed over the pixel electrode 107 and the pixel electrode line 114.

Although the common electrode 106 is formed on the first substrate 100, and the pixel electrode 107 is formed on the gate insulation layer 108 in FIGS. 4 and 5, locations of the common electrode 106 and the pixel electrode 107 are not limited in embodiments of the present invention. The common electrode 106 and the pixel electrode 107 can be formed on the passivation film 111. The common electrode 106 and the pixel electrode 107 may be formed of transparent conductive materials. In the alternative, the pixel electrode can be formed on the first substrate and the common electrode may be formed on the second substrate such that the liquid crystal molecules are driven by a vertical electric field generated between the pixel electrode and the common electrode.

A black matrix 221 for preventing light leakage between the pixels is formed on the second substrate 200. A color filter 223 for providing color display capabilities is also formed on the second substrate 200. Alignment layers 112 and 212 for determining an initial alignment direction of liquid crystal molecules are applied at facing surfaces of the first substrate 100 and the second substrate 200.

The LCD panel controls light transmission by driving liquid crystal molecules 300 with an in-plane electric field generated by the pixel electrode 107 and the common electrode 106. In the related art, an LCD device can only be reliably driven when temperatures external to the device are in a temperature range of −20° C. to 60° C. However, in embodiments of the present invention, an LCD device can be driven when external temperatures are below −20° C. by providing a heat generating electrode 250 that supplies heat to the liquid crystal molecules of the LCD device when a direct current is supplied to the heat generating electrode 250.

Although not illustrated in the drawing, a heating pad for supplying a direct current to the heat generating electrode 250 is separately formed on the first substrate 100. The heating pad can be formed together when forming a gate pad and a data pad (not illustrated). The heat generating electrode 250 and the heating pad can be connected to each other by a conductive tape formed of an Al material.

A driving circuit unit for driving the LCD panel is connected to one side of the LCD panel. The gate pad and the data pad formed at one side of the gate lines and the data lines of the first substrate are connected to the driving circuit unit. Accordingly, the heating pad can be formed together in the process of forming the gate pad and the data pad so as to be formed without a separate additional process.

When the LCD panel comes in contact with an electrified object from the outside, electrification of the color filter substrate affects an arrangement state of the liquid crystal molecules located under the color filter substrate (i.e., liquid crystal molecules in an upper portion of the liquid crystal layer), and image quality deteriorates because of the abnormal arrangement of the liquid crystal molecules. In the case of the common electrode being formed on the color filter substrate, the effects of static electricity are minimal. In the case of an in-plane switching mode in which the common electrode and the pixel electrode are formed on the same substrate, since no metal layer exists on the color filter substrate, the problem of static electricity generation is worse.

To prevent deterioration in image quality caused by static electricity in an in-plane switching mode LCD device, a transparent electrode is separately formed at the rear surface of the color filter substrate. In the embodiments of the present invention, the heat generating electrode 250 is formed in the same process step when forming the electrode for reducing the effect of static electricity. In other words, the heat generating electrode 250 can serve as the electrode to reduce the effect of static electricity. Thus, the heat generating electrode 250 is formed without a separate additional fabrication process. The heat generating electrode 250 prevents static electricity from accumulating on the LCD panel and simultaneously generates heat such that the heat generating electrode 250 serves as a heater for increasing the temperature of the liquid crystal molecules in the LCD panel.

On the other hand, an LCD device in which the common electrode and the pixel electrode are formed on different substrates, the heat generating electrode 250 is formed at the rear surface of the color filter substrate through a separate additional process. In the alternative, an additional heating electrode can also be formed at the rear surface of the color filter substrate. In either case, the heat generating electrode 250 may be formed of a transparent conductive material, such as ITO (indium tin oxide) or IZO (indium zinc oxide).

When a direct current is supplied to the heat generating electrode 250 through the heating pad, heat is generated as result of the sheet resistance of the heat generating electrode 250. Thus, the temperature of the liquid crystal molecules increase because of the heat generated. Since the generated heat is in proportion to the sheet resistance, the amount of generated heat can be controlled by changing an area or the thickness of the heat generating electrode 250. The heat generating electrode 250 may be formed over the entire surface of the second substrate 200 or formed as a pattern on the second substrate 200. In order to generate the same amount of heat, the thickness of the heat generating electrode 250 according to the above two cases are formed differently from each other.

Figure 6:
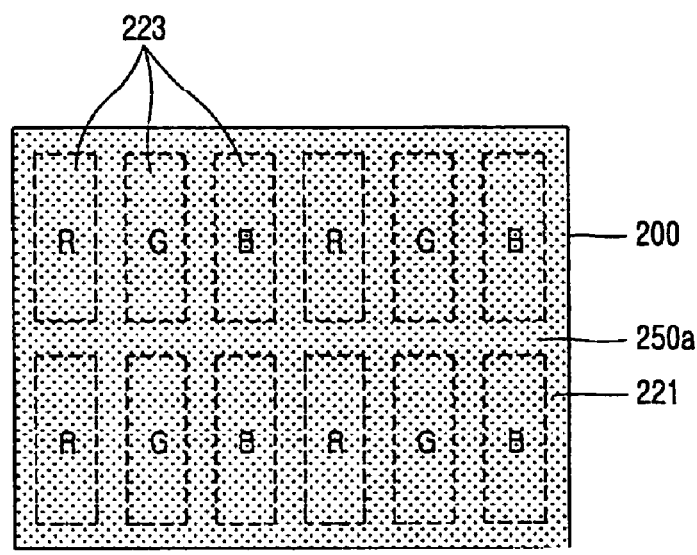
FIG. 6 illustrates a first exemplary embodiment of a heat generating electrode in accordance with an embodiment present invention.
Figure 7:
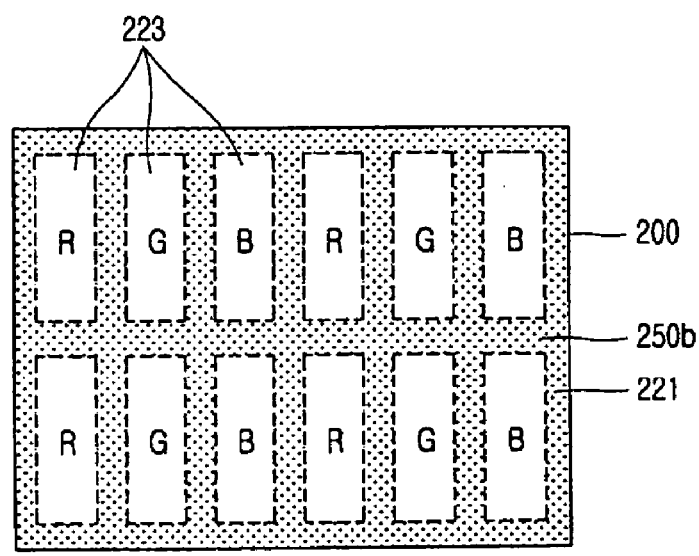
FIG. 7 illustrates a second exemplary embodiment of a heat generating electrode in accordance with an embodiment present invention.
Figure 8:
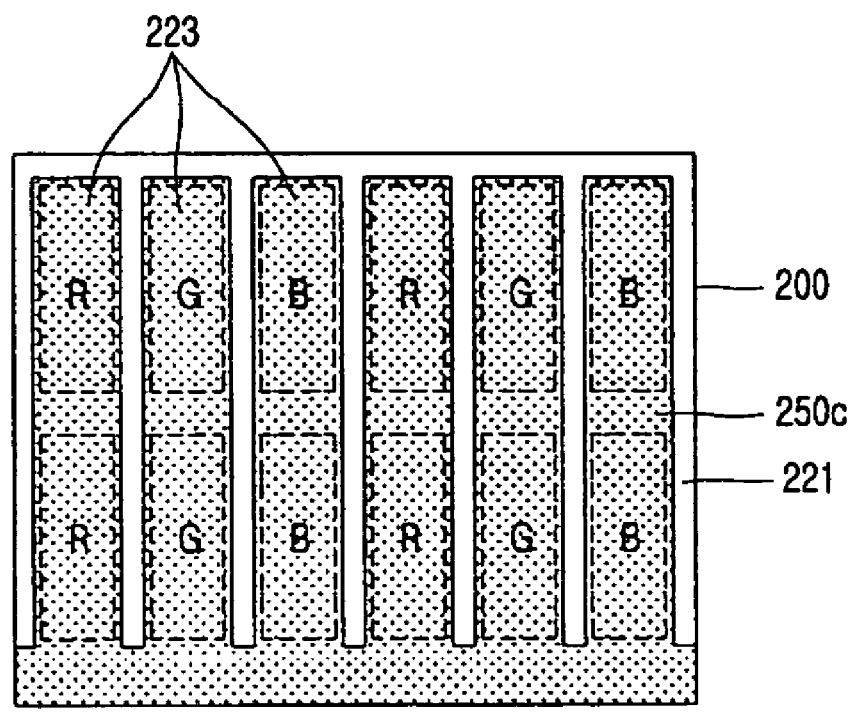
FIG. 8 illustrates a third exemplary embodiment of a heat generating electrode in accordance with an embodiment present invention.

FIGS. 6 to 8 illustrate additional exemplary embodiments of how a heat generating electrode can be formed on the second substrate. FIG. 6 illustrates a first exemplary embodiment of a heat generating electrode in accordance with the present invention. As shown in FIG. 6, a heat generating electrode 250a may be formed over the entire surface of the second substrate 200. The color filter 220 and the black matrix 221 are formed at an opposite side to the heat generating electrode 250a. The color filter regions 223 shown in FIG. 6 is a pixel region where an image is actually displayed.

The direct current is supplied to the heat generating electrode 250a may interfere with the electric field generated between the pixel electrode and the common electrode. To minimize the deterioration of image quality that is caused by such interference, the heat generating electrode 250a is implemented in a pattern form. FIG. 7 illustrates a second exemplary embodiment of a heat generating electrode in accordance with the present invention. As shown in FIG. 7, a heat generating electrode 250b may be formed in a pattern corresponding to the black matrix 221. When the heat generating electrode 250b is formed corresponding to the black matrix 221, deterioration in image quality is reduced because the effect of the direct current upon the electric field between the pixel electrode and the common electrode is greatly reduced as compared to the prior embodiment shown in FIG. 6.

FIG. 8 illustrates a third exemplary embodiment of a heat generating electrode in accordance with the present invention. The interference due to the direct current may be reduced by forming a heat generating electrode 250c at a position corresponding to the pixel region, as shown in FIG. 8. That is, portions of the heat generating electrode pattern 250c that are not carrying the direct current of the heat generating electrode coincides with the pixel electrode. In other words, fingers extend over the pixel regions to conduct heat to the pixel regions from another portion of the heating electrode through which current passes. Accordingly, deterioration in image quality can be reduced as compared to the prior embodiment shown in FIG. 5 by forming the heat generating electrode 250c in a pattern covering the pixel region to conduct heat to the pixel region without current passing through that portion of the pattern. However, a heat generating electrode in accordance with the present invention is not limited to a specific pattern but can be formed in any shape so long as the heat generating electrode can increase the temperature of liquid molecules to a temperature range in which the liquid crystal molecules can be reliably driven. As described in the examples above, to lessen an effect of a direct current, which is supplied to the heat generating electrode, the heat generating electrode may be designed to have appropriate pattern to prevent deterioration of image quality.

As described, the embodiments of present invention allow the display of an image in spite of a LCD device being in an environment in which the temperature is below −20° C. by increasing the temperature of the liquid crystal molecules with a heat generating electrode and thus being able to normally drive the liquid crystal molecules. The heat generating electrode can be formed without a separate additional fabrication process. Further, the heat generating electrode can prevent the build up of static electricity in an in-plane switching mode LCD device.

A separate heat generating electrode can be formed at the rear surface of the color filter substrate. In this instance, the heat generating electrode may be formed over an entire surface of the color filter substrate or formed in a pattern. The heat generating electrode is not limited to any specific shape or pattern.

Embodiments of the present invention have a heat generating electrode for increasing the temperature of the liquid crystal molecules in a LCD device at low environmental temperatures where liquid crystal molecules typically cannot be driven. Embodiments of the present invention can be applied to all kinds of LCD devices and are not limited to IPS (in plane switching) and TN (twisted nematic) modes. Further, a heat generating electrode, which is formed at the rear of the color filter substrate, can be used in all types of LCD devices. As described above, according to embodiments of the present invention, since a heat generating electrode for increasing the temperature of liquid crystal molecules is additionally formed at the rear of the color filter substrate, an image can be displayed despite a low environmental temperature.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
a first substrate having a plurality of gate and data lines on a first side thereof to define a plurality of pixels and a plurality of gate and data pads connected to the respective gate and data lines, the pixel including an image displaying unit for displaying an image and an image non-displaying unit;
a thin film transistor formed adjacent to a crossing of the gate line and the data line;
a second substrate having a black matrix and a color filter on the first side thereof, the black matrix being disposed in a first region corresponding to the image non-displaying unit of the first substrate;
a first polarization plate and a second polarization plate attached respectively to the first substrate and the second substrate;
liquid crystal molecules positioned between the first and second substrates;
a heat generating electrode for generating heat in response to a direct current being supplied to the heat generating electrode, the heat generating electrode being directly deposited in a second region corresponding to the black matrix on a second side of the second substrate opposing to the first side;
a heating pad formed at the first side of the first substrate, the heating pad being electrically connected to the heat generating electrode at the second side of the second substrate for supplying the direct current to the heat generating electrode, wherein the heating pad is made of a same material as the gate and data pads;
a conductive tape for connecting electrically the heating pad with the heat generating electrode and with a case enclosing the first and second substrates; and
a backlight unit for irradiating light onto the first and second substrates,
wherein the heat generating electrode is disposed between the second substrate and the second polarization plate.

2. The device of claim 1, wherein the first substrate includes:
a pixel electrode and a common electrode for generating an in-plane field in the pixel.

3. The device of claim 2, wherein the heat generating electrode is grounded to discharge static electricity.

4. The device of claim 1, wherein the heat generating electrode is formed over an entire surface of the second substrate.

5. The device of claim 1, wherein the conductive tape is formed of an Al material.

6. The device of claim 1, wherein the heat generating electrode is formed of a transparent material.

7. The device of claim 6, wherein the transparent material is formed of one of indium tin oxide and indium zinc oxide.

8. The device of claim 1, further comprising:
a pixel electrode on the first substrate; and
a common electrode on the second substrate.

9. A liquid crystal display device comprising:
a liquid crystal display panel including a first substrate having a thin film transistor array and a plurality of gate and data pads to electrically connect the thin film transistor array with a driver and a second substrate having a color filter, the first substrate and the second substrate being facing each other and liquid crystal molecules being positioned between the first and second substrates;
a first polarization plate and a second polarization plate attached respectively to the first substrate and the second substrate;
a backlight disposed under the liquid crystal display panel for supplying light to the liquid crystal display panel;
a mold frame for mounting and affixing the liquid crystal display panel and the backlight;
a heat generating electrode for generating heat, the heat generating electrode being directly formed on a surface of the second substrate outside of the liquid crystal display panel;
a heating pad formed at a surface of the first substrate inside of the liquid crystal display panel, the heating pad being electrically connected to the heat generating electrode at the outside of the liquid crystal display panel for supplying a direct current to the heat generating electrode, wherein the heating pad is made of the same material as the gate and data pads; and
a conductive tape for connecting electrically the heating pad with the heat generating electrode and with a case enclosing the first and second substrates and the mold frame,
wherein the heat generating electrode is disposed between the second substrate and the second polarization plate.

10. The device of claim 9, wherein the second substrate includes:
a black matrix formed on the second substrate; and
the color filter formed on the black matrix.

11. The device of claim 10, wherein the heat generating electrode is formed in a pattern at an outside surface of the second substrate corresponding to the black matrix.

12. The device of claim 9, further comprising:
a plurality of gate lines arranged in a first direction on the first substrate;
a plurality of data lines arranged perpendicular to the gate lines and defining a plurality of pixels; and
the heat generating electrode has a pattern form disposed in a direction of a long side of the pixels and covers a width of the pixels, wherein the heat generating electrode has a pattern in which fingers extend over the pixels to conduct heat to the pixels from another portion of the heat generating electrode through which the direct current passes.

13. The device of claim 9, wherein the heat generating electrode is formed over an entire surface of the second substrate.

14. The device of claim 9, wherein the conductive tape is formed of an Al material.

15. The device of claim 9, wherein the heat generating electrode is formed of one of indium tin oxide and indium zinc oxide.

* * * * *